United States Patent [19]

Hoshino et al.

[11] Patent Number: 5,303,389
[45] Date of Patent: * Apr. 12, 1994

[54] DATA PROCESSING SYSTEM FOR PROCESSING UNITS HAVING DIFFERENT THROUGHPUTS

[75] Inventors: Akihiko Hoshino, Mitaka; Mikio Itoh, Yokohama; Nobuhiko Kuribayashi, Kawasaki, all of Japan

[73] Assignee: Fujitsu Limited, Kawasaki, Japan

[*] Notice: The portion of the term of this patent subsequent to Apr. 10, 2007 has been disclaimed.

[21] Appl. No.: 429,657

[22] Filed: Oct. 31, 1989

Related U.S. Application Data

[63] Continuation of Ser. No. 905,971, Sep. 11, 1986, Pat. No. 4,916,609.

[30] Foreign Application Priority Data

Sep. 11, 1985 [JP] Japan .................................. 60-200966
Sep. 19, 1985 [JP] Japan .................................. 60-207537

[51] Int. Cl.$^5$ .............................................. G06F 12/02
[52] U.S. Cl. ............................... 395/425; 395/400; 364/228.1; 364/228.3; 364/251.1; 364/260; 364/DIG. 1
[58] Field of Search ... 364/200 MS File, 900 MS File; 395/400, 425, 800

[56] References Cited

U.S. PATENT DOCUMENTS

| | | | |
|---|---|---|---|
| 3,924,245 | 12/1975 | Eaton et al. | 364/200 |
| 4,594,657 | 6/1986 | Byrns | 364/200 |
| 4,783,736 | 11/1988 | Ziegler et al. | 364/200 |
| 4,787,065 | 11/1988 | Barazesh et al. | 364/900 |

Primary Examiner—Parshotam S. Lall
Assistant Examiner—Ayni Mohamed
Attorney, Agent, or Firm—Staas & Halsey

[57] ABSTRACT

In a data processing system including at least two processing units having different throughputs for performing sequential access upon a main storage unit, the number of elements of the main storage unit simultaneously accessed by the processing units is different, or the sequence of elements accessed by one of the processing units is reversed, thereby substantially improving the input/output throughput for the main storage unit.

2 Claims, 10 Drawing Sheets

DATA PROCESSING SYSTEM FOR PROCESSING UNITS HAVING DIFFERENT THROUGHPUTS

This is a continuation of copending application Ser. No. 06/905,971 now U.S. Pat. No. 4,916,609 filed on Sep. 11, 1986.

BACKGROUND OF THE INVENTION

1. Field of the Invention

The present invention relates to a data processing system including at least two processing units having different throughputs for a main storage unit.

2. Description of the Related Art

Recently, in an effort to provide more rapid processing, vector computers have been developed. But even in such a computer, when carrying out an ultra-large scale scientific calculation, sometimes it is not possible for all of the data to be stored at the same time in a main storage unit, thus increasing the overhead of the input/output processing. Accordingly, to reduce this overhead, an extended storage unit is provided in addition to the main storage unit.

Note, an extended storage control unit for the extended storage unit has a smaller throughput for the main storage unit than other units such as a vector unit.

In a computer system having a plurality of processing units, such as the vector unit, the extended storage control unit, and the like, the processing units have different throughputs for the main storage unit, and when the processing units perform sequential access upon the main storage unit simultaneously, there may be a problem in that the throughput of one processing unit, such as the vector unit having a large throughput, becomes the same as that of another processing unit, such as the extended storage control unit having a small throughput, thereby reducing the data processing efficiency of the system. This will be later explained in more detail.

SUMMARY OF THE INVENTION

It is an object of the present invention to provide a data processing system including at least two processing units having different throughputs in which the data processing efficiency is improved.

According to the present invention, in a data processing system including at least two processing units having different throughputs for a main storage unit, the number of elements simultaneously accessed by the processing unit having a large throughput is smaller than the number of elements simultaneously accessed by the processing unit having a small throughput, or the sequence of elements accessed by one of the processing units is reversed. As a result, even when the processing units perform sequential access upon the main storage unit simultaneously, the reduction of the throughput of a processing unit having a large throughput can be avoided.

BRIEF DESCRIPTION OF THE DRAWINGS

The present invention will be more clearly understood from the description as set forth below with reference to the accompanying drawings, wherein.

DETAILED DESCRIPTION OF THE PREFERRED EMBODIMENTS

Figure 1:
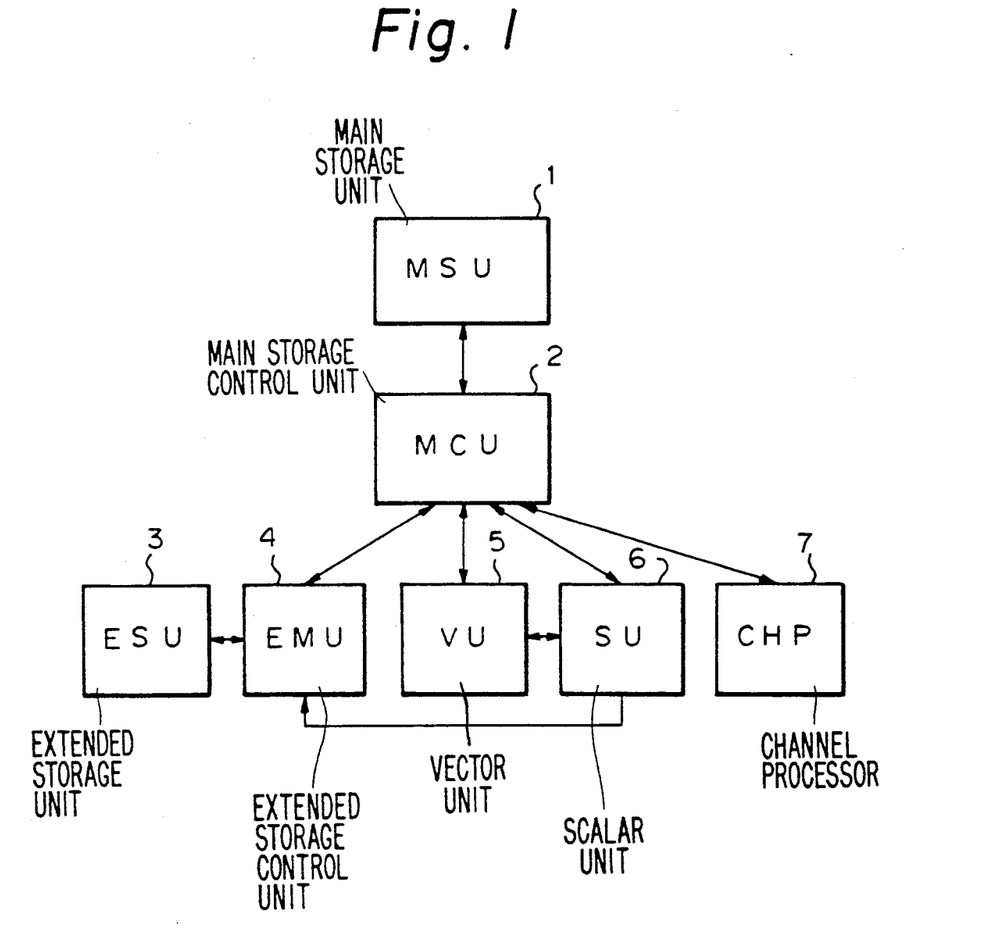
FIG. 1 a block circuit diagram of a computer system to which the present invention is applied.

FIG. 1 illustrates a computer system to which the present invention is applied. This system is comprised of a main storage unit (MSU) 1, a main storage control unit (MCU) 2, an extended storage unit (ESU) 3, an extended storage control unit (EMU) 4, a vector unit 5, a scalar unit 6, and a channel processor 7 to which a plurality of channels (not shown) are connected.

The scalar unit 6 comprises a program status word (PSW) register, control registers, general registers, floating point registers, and the like to read and decode all instructions. As a result, if the scalar unit 6 recognizes instructions as scalar instructions, such scalar instructions are carried out in the scalar unit 6. Conversely, if the scalar unit 6 recognizes instructions as load/store instructions for the extended storage unit 3, such load/store instructions including instruction codes, addresses, operands and the like are delivered to the extend storage control unit 4 which executes the load/store instructions. Further, if the scalar unit 6 recognizes instructions as vector instructions such as load/store instructions, such vector instructions including instruction codes, addresses, operands and the like are delivered to the vector unit 5 which executes the vector instructions.

Note that the scalar unit 6, the vector unit 5, and the extended storage control unit 4 can operate independently from each other. That is, after the scalar unit 6 delivers instructions to the vector unit 5 and the extended storage control unit 4, the scalar unit 6 can process another instruction.

The extended storage control unit 4 comprises a load/store pipeline (not shown) which has an access throughput of one element per one cycle ($\tau$) for the main storage unit 1, however, in this case, one access is carried out by every four elements per four cycles, thereby improving the access efficiency.

The vector unit 5 comprises a load/store pipeline (not shown) which has an access throughput of four elements per one cycle for the main storage unit 1.

Therefore, the throughput of the vector unit 5 is four times as large as that of the extended storage control unit 4.

Figure 2A:
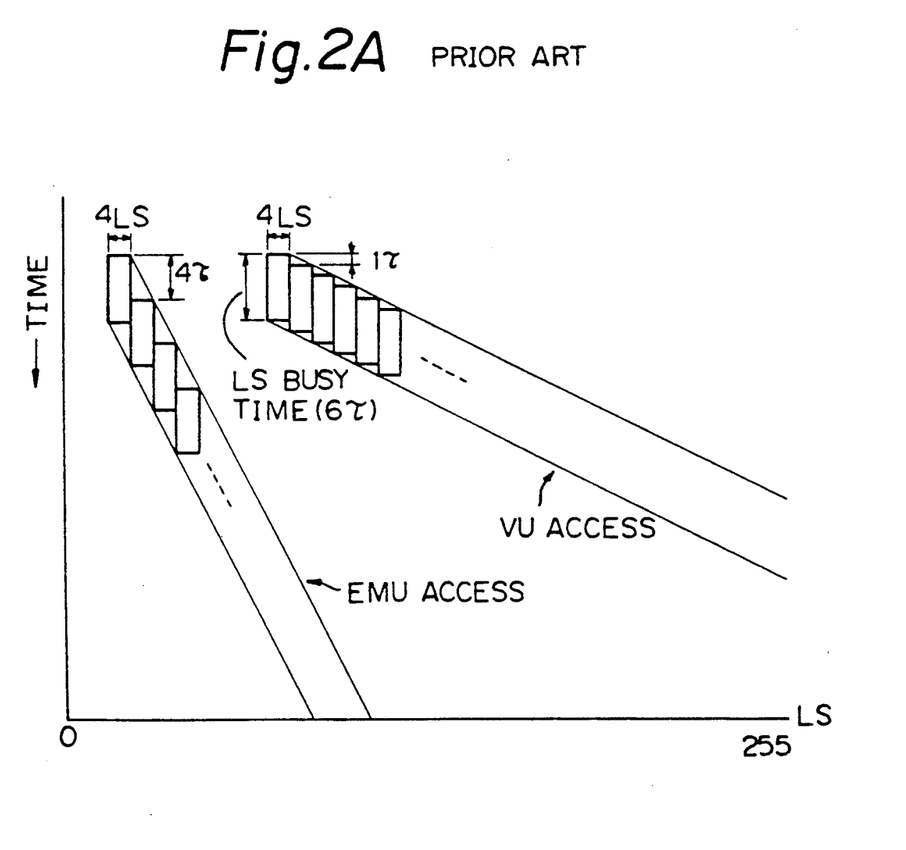
FIGS. 2A and 2B are timing diagrams for explaining the prior art input/output access for the main storage unit.
Figure 2B:
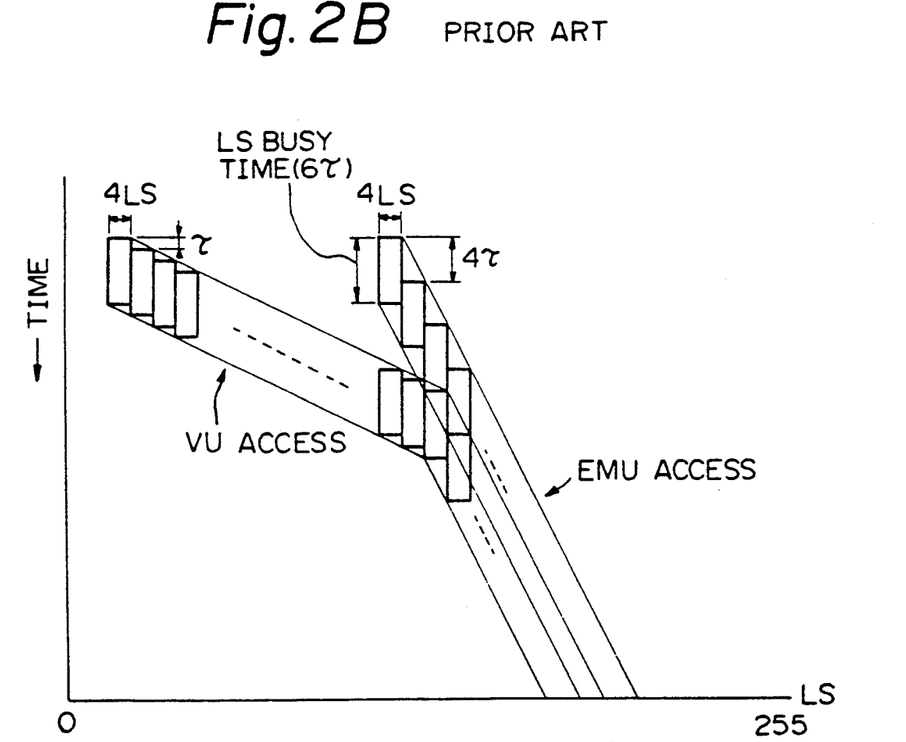

In FIGS. 2A and 2B, which show the prior art access state, the ordinate designates time and the abscissa designates a logic storage number (LS) of the main storage unit 1. Also, when a logic storage number LS is accessed the line is extended toward the longitudinal direction by an LS busy time during which other accesses are forbidden for this LS busy time even when such other accesses are requested. This LS busy time is, for example, 6τ. Further, an EMU access is carried out by the extended storage control unit 4, and a VU access is carried out by the vector unit 5.

In FIG. 2A, the throughput of a VU access by the vector unit 5 is not reduced since there is no competition between the EMU access and the VU access.

In FIG. 2B, the VU access is delayed due to the LS busy time by the EMU access, until the LS busy time is "OFF". As a result, the access throughput of the vector unit 5 is reduced, and accordingly, it is the same as that of the extended storage control unit 4.

According to the present invention, the reduction of the access throughput of a processing unit, such as the vector unit 5, having a large throughput can be avoided.

Figure 3:
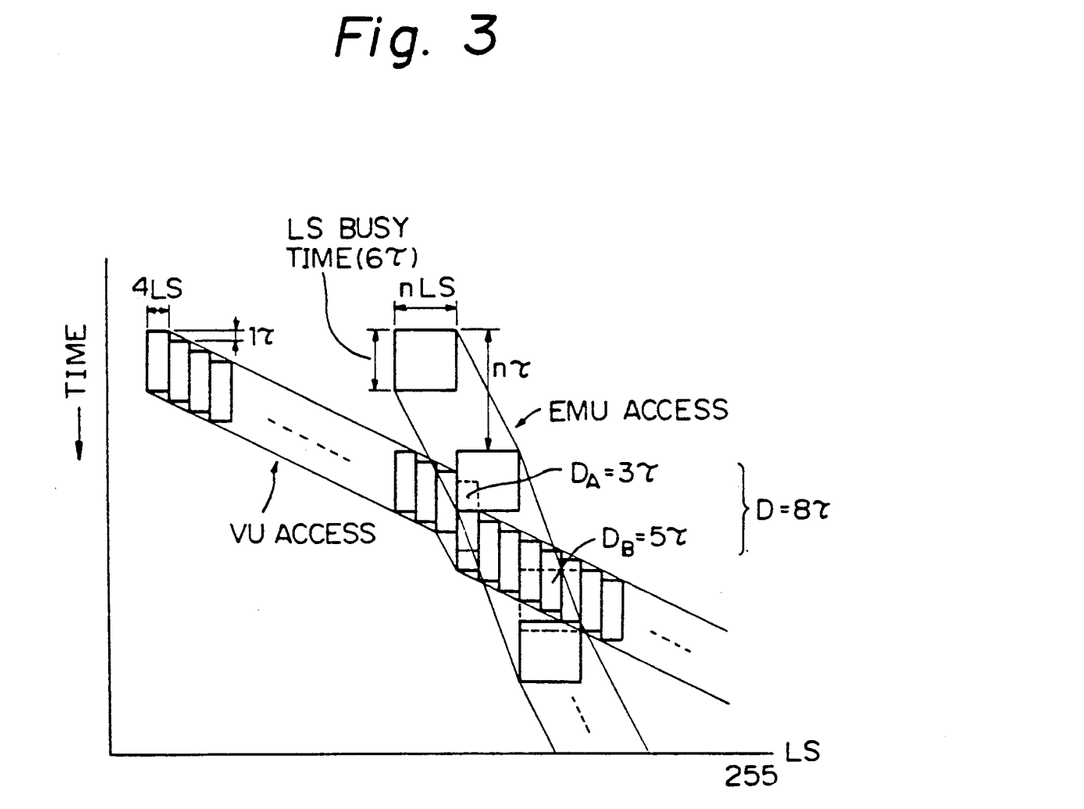
FIG. 3 is a timing diagram for explaining a principle of input/output access for the main storage unit according to the present invention.

In FIG. 3, which shows one principle of an access state according to the present invention, EMU access is carried out for every n elements of the main storage unit 1. As a result, since the throughput of the EMU access is 4 elements/4τ, when every n elements are accessed, the period is nτ. Accordingly, there is a gap between each access of the n elements. Therefore, even when the VU access competes with the EMU access at the same logic storage LS, the VU access passes through a gap between the EMU accesses.

The value n is an integer which satisfies the condition:

$$n \geq ac/(a - b) \quad (1)$$

where a (elements/τ) is a throughput of a processing unit such as the vector unit 5 having a large throughput;

b (elements/τ) is a throughput of a processing unit such as the extended storage control unit 4 having a small throughput; and c(τ) is an LS busy time. In other words, the ratio of number of elements simultaneously accessed by the two processing units is larger than $$\frac{nb}{a} \geq \frac{bc}{a - b} \quad (1)'$$

Figure 4:
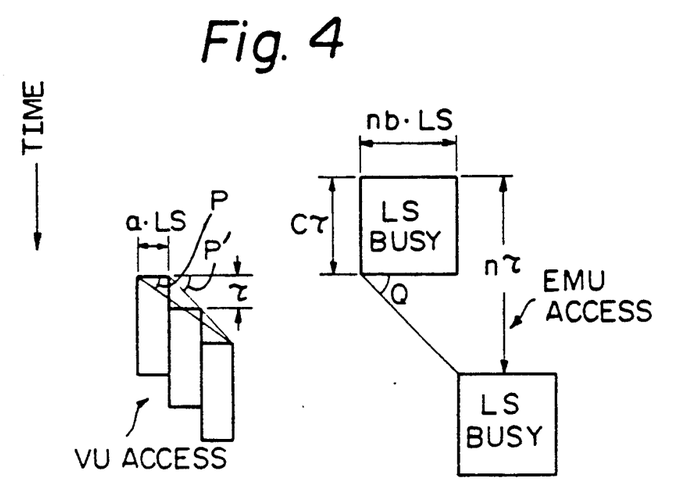
FIG. 4 is a diagram for explaining the formula (1)

The formula (1) (or (1)') is explained by using FIG. 4. In FIG. 4, the angle Q must be larger than the angle P, so as to pass the stream of the VU access through the gap of the busy LS's of the EMU accesses. That is, if $Q \leq PP$, the stream of the VU access is always prevented by the busy LS of the EMU access.

For simplicity, when P' is used instead of P, since $Q \geq P' (>P)$, $$(n-c)/nb > 1/a,$$

the formula (1) (or (1)') can be obtained.

Thus, when the VU access competes with the EMU access at the same logic storage LS of the main storage unit 1, a delay time D due thereto is within $$D \leq 3c + ac/nb \quad (2)$$

Figure 5:
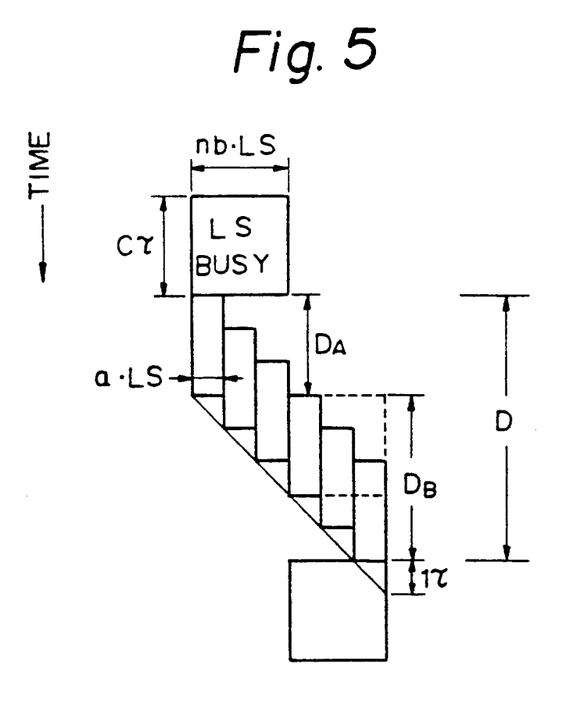
FIG. 5 is a diagram for explaining the formula (2)

The formula (2) can be explained by using FIG. 5.

The delay time D is comprised of a delay time $D_A$ due to the busy LS of the EMU access and a delay time $D_B$ due to the busy LS of the vector unit 5.

The maximum of the delay time $D_A$ is the LS busy time c, and the delay time $D_B$ is determined by $$D_B = 2c - ac/nb.$$

Thus, the formula (2) can be obtained.

When the throughput of the EMU access is 1 element/1τ, the throughput of the VU access is 4 elements/1τ, and the LS busy time is 6τ, FIG. 3 shows an access state where n=12, and in this case, $D_A = 3\tau$ and $D_B = 5\tau$, and accordingly, $D = 8\tau$.

Thus, when a plurality of processing units perform sequential accesses upon the main storage unit 1 simultaneously, the problem wherein the throughput of a processing unit having a large throughput is reduced and is the same as that of a processing unit having a small throughput, is resolved.

Figures 6, 6A:
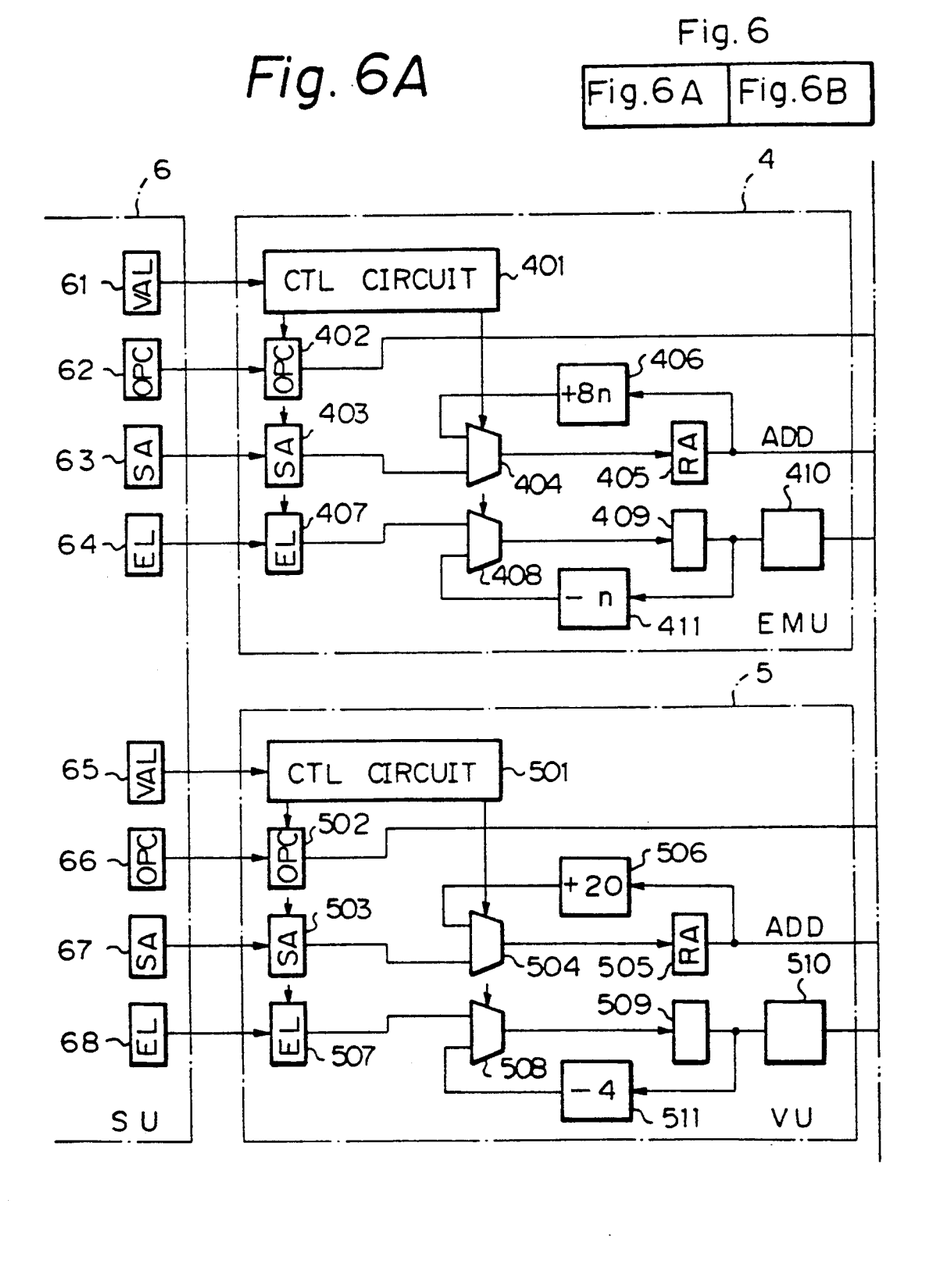
FIGS. 6A and 6B are a detailed circuit diagram of the extended storage control unit, the vector unit, and the main storage control unit of FIG. 1 realizing the principle of FIG. 3.

In FIG. 6, which is a detailed circuit diagram of the extended storage control unit 4, the vector unit 5, and the main storage control unit 2 of FIG. 1 for realizing the principle of FIG. 3, the scalar unit 6 comprises registers 61 to 64 for controlling the extended storage control unit 4, and registers 65 to 68 for controlling the vector unit 5. Also, the extended storage control unit 4 comprises a control circuit 401 enabled by the valid signal from the register 61 of the scalar unit 6, an operation code (OPC) register 402, a start address (SA) register 403, a selector 404, a request address (RA) register 405, an +8n adder 406, an element number (EL) register 407, a selector 408, a subtraction register 409, a request control circuit 410, and a −n subtractor 411. Further, the vector unit 5 comprises a control circuit 501 enabled by the valid signal from the register 65 of the scalar unit 6, an operation code (OPC) register 502, a start address (SA) register 503, a selector 504, a request address (RA) register 505, a +20 adder 506, an element number (EL) register 507, a selector 508, a subtraction register 509, a request control circuit 510, and a −4 subtractor 511.

Figure 6B:
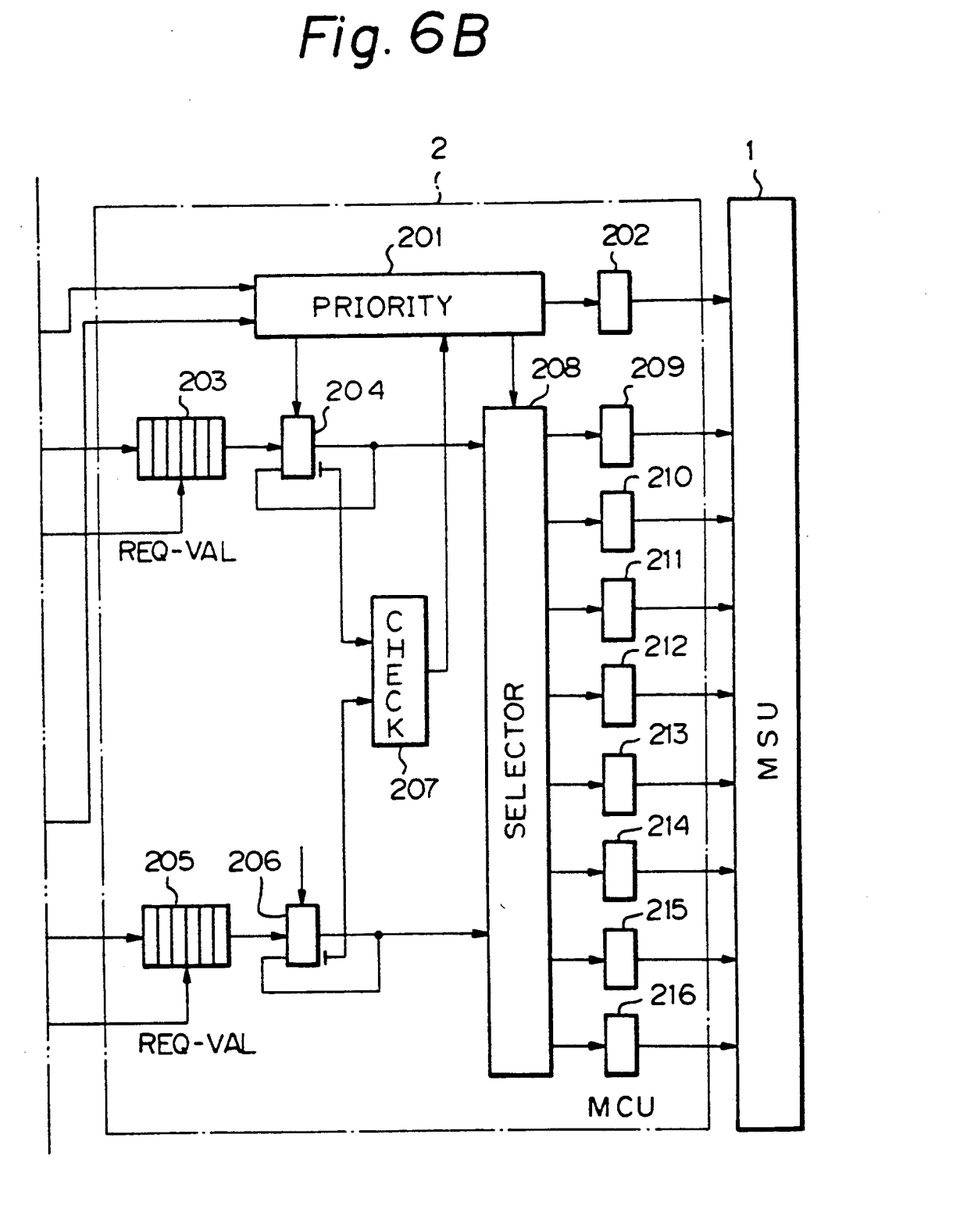

The main storage control unit 2 comprises a priority sequence determination circuit 201, connected to a start register 202, a queue stage (stack) 203 for storing addresses, a register 204, a queue stage (stack) 205, a register 206, a busy check circuit 207, a selector 208, and eight registers 209 to 216 which are connected to the main storage unit 1 which, in this case, interleaves eight ways. Note that the main storage control unit 2 has the same configuration for the scalar unit 6 and the channel processor 7. The queue stage 203 stores sequential addresses ADD from the request address register 405 when the request control circuit 410 generates a request valid (REQ-VAL) signal. The queue stage 205 stores sequential addresses ADD from the request address register 505 when the request control circuit 510 generates a request valid (REQ-VAL) signal. The priority sequence determination circuit 201 receives operation code signals from the operation code registers 402 and 502, and checks the LS busy state by the busy check circuit 207, the bus conflict state, the other priority sequence conditions, and the like. As a result, the priority sequence determination circuit 201 determines an actual access to the main storage unit 1 based upon the priority sequence thereof, to set addresses in the registers 209 to 216. A write/read operation of the main storage unit 1 is started by a start signal from the register 202.

If the start address (SA) of the EMU access is "10000" (HEX), the number (EL) of elements is 256, and the operation code is "STORE", the extended storage control unit 4 operates as follows. Note that, in this case, an address is allocated for each byte, and one element is comprised of 8 bytes.

The control circuit 401 is enabled by the output of the register 61 of the scalar unit 6 which operates the registers 402, 403, and 407. That is, the "STORE" code of the register 62 is set in the operation code register 402, "10000" of the register 63 is set in the start address register 403, and "100" (HEX) of the register 64 is set in the element number register 407. In this case, since the selector 404 selects a path from the start address register 403 to the request address register 405, the content of the start address register 403 is transmitted via the selector 404 to the request address register 405. Similarly, since the selector 408 selects a path from the element number register 407 to the subtraction register 409, the content of the element number register 407 is transmitted via the selector 408 to the subtraction register 409. In this case, the request control circuit 410 generates a request valid (REQ-VAL) signal, and accordingly, the request address of the request address register 405 is set in the queue stage 203.

Then, the control circuit 401 operates the selector 404 to switch the selector 404, so that a path from the request address register 405 via the +8n adder 406 to the request address register 405 is selected. Thus, 8n is added to the content of the request address register 405. Simultaneously, the control circuit 401 operates the selector 408, to switch the selector 408, so that a path from the subtraction register 409 via the −n subtractor 411 to the subtraction register 409 is selected. Thus, n is subtracted from the content of the subtraction register 409. This operation is repeated until the content of the subtraction register 409 reaches zero.

The vector unit 5 operates in the same way as the extended storage control unit 4, except for the +20 adder 506 and the −4 subtractor 511.

That is, every n elements (n is, for example, 8) are accessed by the extended storage control unit 4, while every 4 elements are accessed by the vector unit 5.

Thus, the principle of FIG. 3 is realized.

Figure 7:
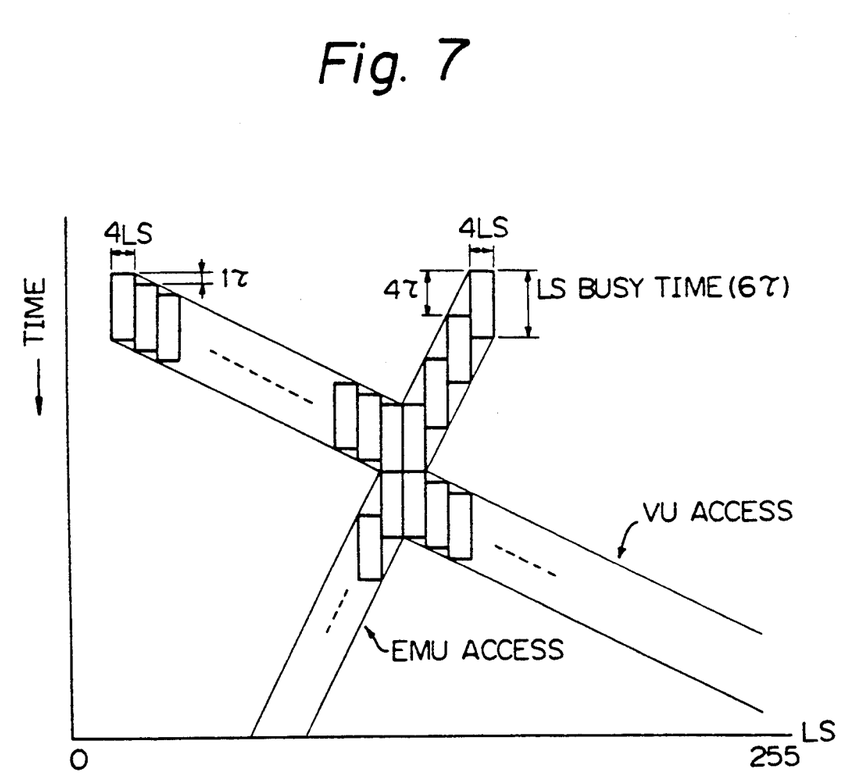
FIG. 7A is a timing diagram for explaining another principle of input/output access for the main storage unit according to the present invention.

FIG. 7, which shows another principle of an access state according to the present invention. When accessing sequential elements of the main storage unit 1, it is common to access them in an ascending order from a small logic storage LS to a large logic storage LS. However, in FIG. 7, the access sequence of one of the processing units is reversed, i.e., a descending order.

In FIG. 7, the VU access is carried out by an ascending order of elements, but the EMU access is carried out by a descending order of elements.

Thus, even when the VU access competes with the EMU access, a competition time is within the LS busy time $c(\tau)$, thereby assuring the throughput.

Figure 8A:
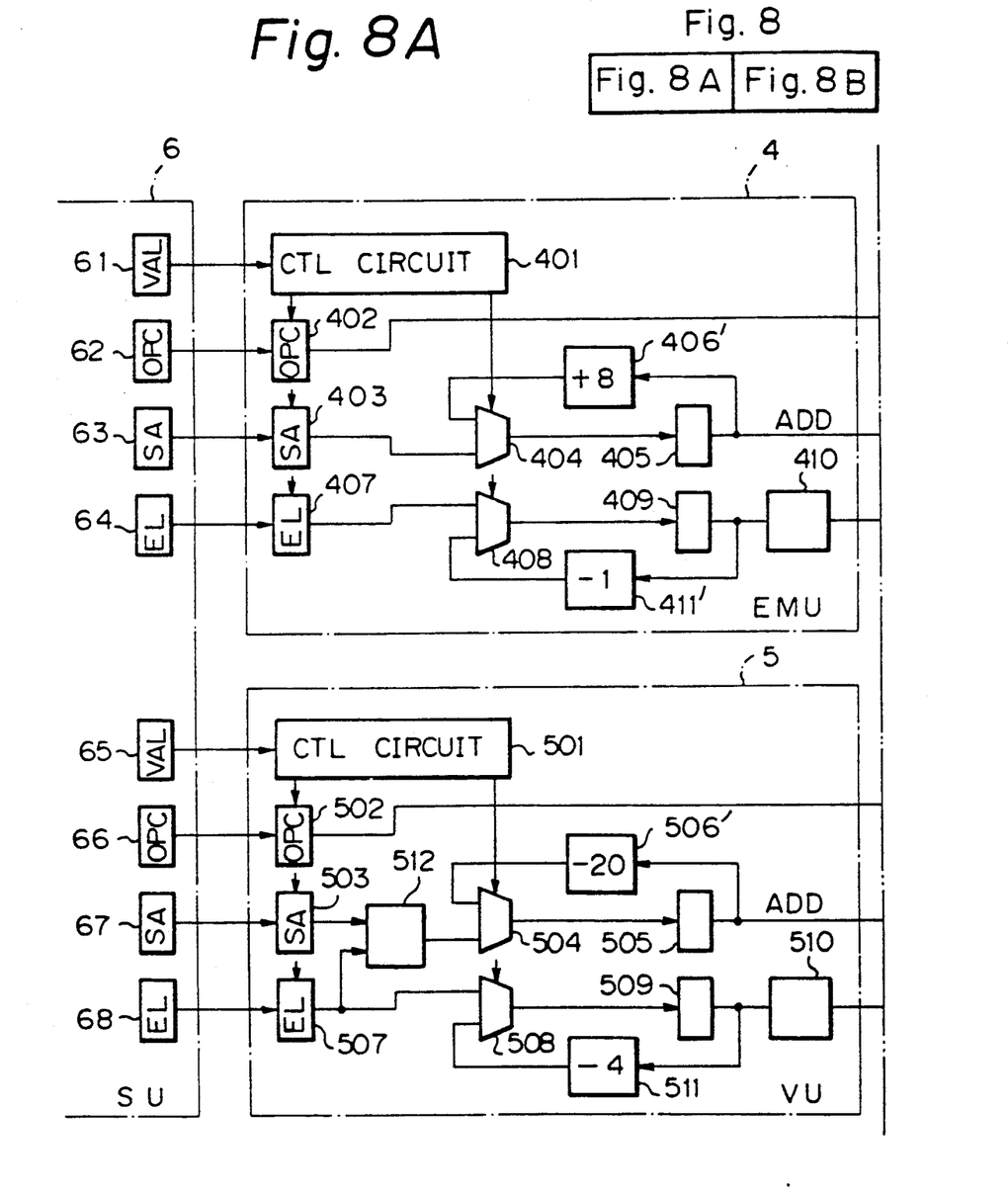
FIGS. 8A and 8B are a detailed circuit diagram of the extended storage control unit, the vector unit, and the main storage control unit of FIG. 1 for realizing the principle of FIG. 7.
Figure 8B:
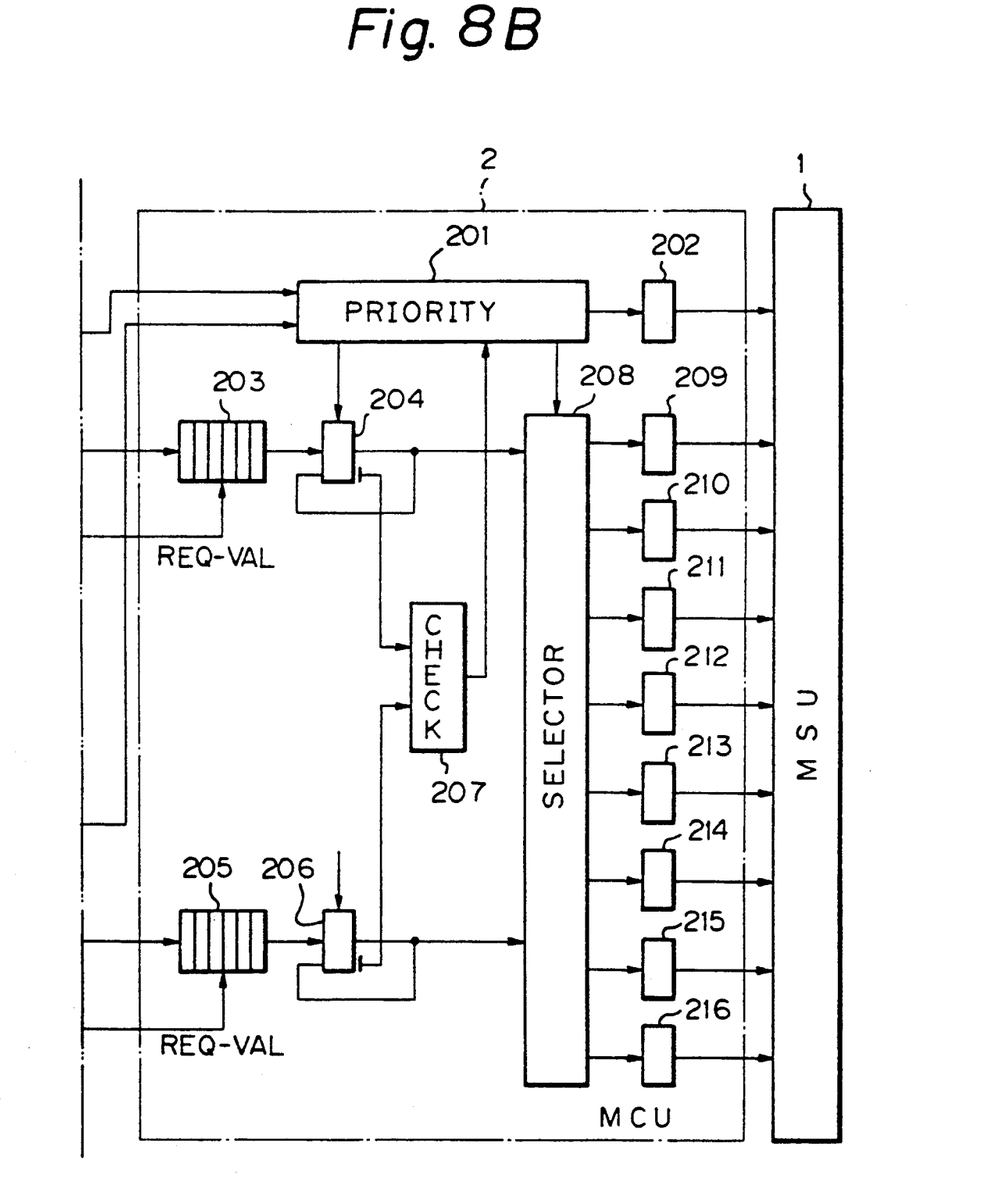

In FIG. 8, which is a detailed circuit diagram of the extended storage control unit 4, the vector unit 5, and the main storage control unit 2 of FIG. 1 for realizing the principle of FIG. 7, the extended storage control circuit 4 is similar to that of FIG. 6 except for a +8 adder 406' and a −1 subtractor 411'. That is, in this case, every one element is accessed in an ascending order by the extended storage unit 4. Also, the vector unit 5 is similar to that of FIG. 6 except for a −20 subtractor 506', and an end address calculation circuit 512. That is, in this case, every 4 elements are accessed in a descending order by the vector unit 5. Further, the main storage control unit 2 is entirely the same as that of FIG. 6.

If the start address (SA) of the VU access is "10000" (HEX), the number (EL) of elements is 256, and the operation code is "STORE", the vector unit 5 operates as follows.

The control circuit 501 is enabled by the output of the register 65 of the scalar unit 6 which operates the registers 502, 503, and 507. That is, the "STORE" code of the register 66 is set in the operation code register 502, "10000" of the register 67 is set in the start address register 503, and "100" (HEX) of the register 68 is set in the element number register 507.

In the end address calculation circuit 512, an end address "SA+EL*8" is calculated from the start address (SA) of the start address register 503 and the element number (EL) of the element number register 507. In this case, since the selector 504 selects a path from the circuit 512 to the request address register 505, the content of the end address calculation circuit register 512 is transmitted via the selector 504 to the request address register 505. Similarly, since the selector 508 selects a path from the element number register 507 to the subtraction register 509, the content of the element number register 507 is transmitted via the selector 508 to the subtraction register 509. In this case, the request control circuit 510 generates a request valid (REQ-VAL) signal, and accordingly, the request address of the request address register 505 is set in the queue stage 205.

Then, the control circuit 501 operates the selector 504 to switch the selector 504, so that a path from the request address register 505 via the −20 subtractor 506' to the request address register 505 is selected. Thus, −20 (HEX) is subtracted from the content of the request address register 505. Simultaneously, the control circuit 501 operates the selector 508 to switch the selector 508, so that a path from the subtraction register 509 via the −4 subtractor 511 to the subtraction register 509 is selected. Thus, 4 is subtracted from the content of the subtraction register 509. This operation is repeated until the content of the subtraction register 509 reaches zero.

Thus, the vector unit 5 accesses every 4 elements sequentially in a descending order.

Note that, if the extended storage control unit 4 accesses every one element sequentially in a descending order, the vector unit accesses every 4 elements sequentially in an ascending order.

As explained above, according to the present invention, even when simultaneous accesses from a plurality of processing units having different access throughputs are performed upon the main storage unit, the reduction of throughput of a processing unit having a large throughput can be avoided, and accordingly, the effect contributing to the improvement of data processing efficiency is very large.

We claim:

1. A data processing system, comprising:
   a main storage unit comprising interleaved storage elements;
   a first processing unit, connected to said main storage unit, for performing at a first speed sequential access of a data area in said main storage unit in ascending order of the storage elements; and
   a second processing unit, connected to said main storage unit, for performing at a second speed, different from the first speed, sequential access of data in the data area simultaneously accessed by said first processing unit in said main storage unit in descending order of the storage elements, the data having a starting address and a number of elements, said second processing unit including means for calculating descending addresses by initially adding the starting address and the number of elements and subsequently decrementing by an amount of the data accessed until the starting address is reached.

2. A system as set forth in claim 1, wherein said first processing unit comprises a vector unit, and said second processing unit comprises an extended storage control unit.

* * * * *

UNITED STATES PATENT AND TRADEMARK OFFICE
CERTIFICATE OF CORRECTION

PATENT NO. : 5,303,389

DATED : April 12, 1994

INVENTOR(S) : Hoshino et al.

It is certified that error appears in the above-indentified patent and that said Letters Patent is hereby corrected as shown below:

Title Page [75], line 1, "Mitaka" should be --Tokyo--;

Col. 1, line 31, "unit, and when" should be --unit. When--.

Col. 2, line 10, "7A" should be --7--.

Col. 3, lines 18, 22 and 26 "n" should be --$\underline{n}$--;

line 32, "a" should be --$\underline{a}$--.

line 34, "b" should be --$\underline{b}$--;

line 37, "c($\tau$)" should be --$\underline{c}(\tau)$--.

line 52, equation should be --$(n-c)/nb \geq 1/a,$--.

UNITED STATES PATENT AND TRADEMARK OFFICE
CERTIFICATE OF CORRECTION

PATENT NO. : 5,303,389

DATED : April 12, 1994

INVENTOR(S) : Hoshino et al.

PAGE 2 of 2

It is certified that error appears in the above-indentified patent and that said Letters Patent is hereby corrected as shown below:

Col. 4, line 6, "n" should be --$\underline{n}$--.

Col. 5, line 23, "8n" should be --8$\underline{n}$--.

line 28, "n" should be --$\underline{n}$--.

line 35, "n" should be --$\underline{n}$--(both occurrences).

line 39, FIG. 7, which shows" should be --FIG. 7 shows--.

Signed and Sealed this

Twenty-eighth Day of January, 1997

Attest:

BRUCE LEHMAN

Attesting Officer   Commissioner of Patents and Trademarks